United States Patent
Gassner et al.

(10) Patent No.: US 12,244,597 B1
(45) Date of Patent: Mar. 4, 2025

(54) SYSTEM AND METHOD FOR PROCESSING EMAILS IN ENTERPRISE CONTENT MANAGEMENT

(71) Applicant: Veeva Systems Inc., Pleasanton, CA (US)

(72) Inventors: Peter Gassner, Pleasanton, CA (US); Graham Gelwicks, San Francisco, CA (US); Jon Stone, Manteca, CA (US); Andrew Han, Needham, MA (US); Tanay Nagjee, Dublin, CA (US); Mark Arnold, Richmond, VA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 17/588,160

(22) Filed: Jan. 28, 2022

(51) Int. Cl.
  *H04L 9/40* (2022.01)
  *G06Q 10/10* (2023.01)
  *H04L 51/08* (2022.01)

(52) U.S. Cl.
  CPC .......... *H04L 63/101* (2013.01); *G06Q 10/10* (2013.01); *H04L 51/08* (2013.01)

(58) Field of Classification Search
  CPC ....... H04L 63/101; H04L 51/08; H04L 51/00; H04L 51/23; H04L 51/42; H04L 51/234; H04L 67/59; H04L 51/02; H04L 51/56; H04L 67/306; H04L 51/212; H04L 51/214; H04L 51/216; G06Q 10/10; G06Q 10/107; G06Q 30/06; G06Q 10/00; G06F 16/242; G06F 16/285; H04W 88/184; H04M 1/575
  See application file for complete search history.

(56) References Cited

U.S. PATENT DOCUMENTS

| | | | |
|---|---|---|---|
| 6,563,912 B1 * | 5/2003 | Dorfman | H04L 51/56 379/93.24 |
| 7,469,280 B2 * | 12/2008 | Simpson | G06Q 10/107 709/224 |
| 7,730,148 B1 * | 6/2010 | Mace | H04L 51/42 711/170 |
| 8,219,623 B2 * | 7/2012 | Tribble | G06Q 10/107 709/206 |
| 9,882,853 B1 * | 1/2018 | Zlatnik | H04L 51/02 |
| 10,254,945 B1 * | 4/2019 | Gupta | H04L 67/306 |
| 10,834,257 B1 * | 11/2020 | Yoskowitz | H04W 68/005 |
| 12,095,717 B1 * | 9/2024 | Perrin | H04L 51/212 |
| 2002/0112014 A1 * | 8/2002 | Bennett | H04W 88/184 709/206 |
| 2005/0108435 A1 * | 5/2005 | Nowacki | G06Q 10/107 707/999.01 |
| 2006/0010213 A1 * | 1/2006 | Mehta | G06Q 30/06 709/206 |
| 2006/0010322 A1 * | 1/2006 | Novack | H04L 51/234 713/170 |
| 2006/0015533 A1 * | 1/2006 | Wolf | G06F 16/20 |

(Continued)

*Primary Examiner* — Dustin Nguyen

(57) ABSTRACT

Systems and methods for processing emails in a content management system. The content management system may have two or more repositories. Users associated with a customer of a content management system, e.g., a pharmaceutical company, may send emails to a master email address, or email processor username, specifically created for an email processor in the content management system. The email processor may automatically create documents, records and attachments from the emails.

13 Claims, 8 Drawing Sheets

(56) References Cited

U.S. PATENT DOCUMENTS

| | | | | |
|---|---|---|---|---|
| 2006/0095528 | A1* | 5/2006 | Sykes, Jr. | H04L 51/23 |
| | | | | 709/206 |
| 2006/0129602 | A1* | 6/2006 | Witriol | H04L 51/00 |
| 2008/0195717 | A1* | 8/2008 | Brown | G06Q 10/00 |
| | | | | 709/207 |
| 2009/0030989 | A1* | 1/2009 | Maresh | G06Q 10/107 |
| | | | | 709/206 |
| 2009/0100073 | A1* | 4/2009 | Dargahi | G06F 16/285 |
| 2009/0265435 | A1* | 10/2009 | Chen | H04L 51/214 |
| | | | | 709/206 |
| 2010/0017476 | A1* | 1/2010 | Shue | G06Q 10/00 |
| | | | | 709/206 |
| 2010/0255817 | A1* | 10/2010 | Chen | H04M 1/575 |
| | | | | 455/412.2 |
| 2012/0137307 | A1* | 5/2012 | Sarferaz | G06Q 10/10 |
| | | | | 719/317 |
| 2013/0318135 | A1* | 11/2013 | Nourani | G06F 16/242 |
| | | | | 707/827 |
| 2014/0033324 | A1* | 1/2014 | Kiang | H04L 67/59 |
| | | | | 726/27 |
| 2017/0134316 | A1* | 5/2017 | Cohen | H04L 51/216 |
| 2018/0225340 | A1* | 8/2018 | Waddoups | G06Q 10/107 |
| 2022/0075658 | A1* | 3/2022 | Bischel | G06F 9/5027 |

* cited by examiner

FIG. 7

SYSTEM AND METHOD FOR PROCESSING EMAILS IN ENTERPRISE CONTENT MANAGEMENT

BACKGROUND

The subject technology relates generally to content management, and more particularly to processing emails in enterprise content management systems.

Users increasingly depend on content management systems because of their ubiquitous and managed access, from anywhere, at any time, from any device. Users often need to store emails in content management systems. However, with previous content management systems, users have to manually download and store the emails. Thus, it is desirable to provide a system which enables more efficient email processing in content management systems.

SUMMARY

The disclosed subject matter relates to a method for processing emails in a content management system, wherein the content management system comprises a first repository, a second repository, and a first email processor. The method comprises: displaying an email processor configuration user interface, wherein the email processor user interface has a plurality of areas for receiving configuration information for the first email processor. The method comprises: receiving, at a first area on the email processor user interface, an email processor username, wherein the email processor username is associated with the first email processor. The method comprises: receiving, at a second area on the email processor user interface, a first group of allowed senders who are allowed to send emails to the email processor username; receiving, at a third area on the email processor user interface, a first action to be performed by the first email processor on a first incoming email; receiving the first incoming email at the first email processor; and determining if a sender of a first incoming email is in the first group of allowed senders by the email processor.

BRIEF DESCRIPTION OF THE DRAWINGS

FIG. 7 illustrates an example email processor configuration user interface according to one embodiment of the present invention.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

The subject technology is directed to techniques for processing emails in content management systems. Users often need to store emails in content management systems. Different applications need to handle the emails in different ways. For example, in a clinical or regulatory application for a pharmaceutical company, documents or attachments may need to be created from emails. While in a quality application for a pharmaceutical company, emails from potential users, which may complain about some issues or drugs, may need to be turned into records, Nowadays, users have to download emails and attachments and manually upload them to content management systems or manually create records to be stored in content management systems.

The present invention allows users associated with a customer of a content management system, e.g., a pharmaceutical company, to send emails to a master email address, or email processor username, specifically created for an email processor in the content management system. The email processor may automatically create documents, records and attachments from the emails. Customers may create the master email address themselves, e.g., clinical@123.veevavault.com, or correspondence@abc.veevavault.com.

Incoming emails may be converted into email records and documents within the content management system and then further processed by one or more Email processors in the content management system. Customers may choose to use standard email processors in the content management system, or customize a standard email processor with a Java SDK associated with the content management system to address their specific business needs.

Figure 1:
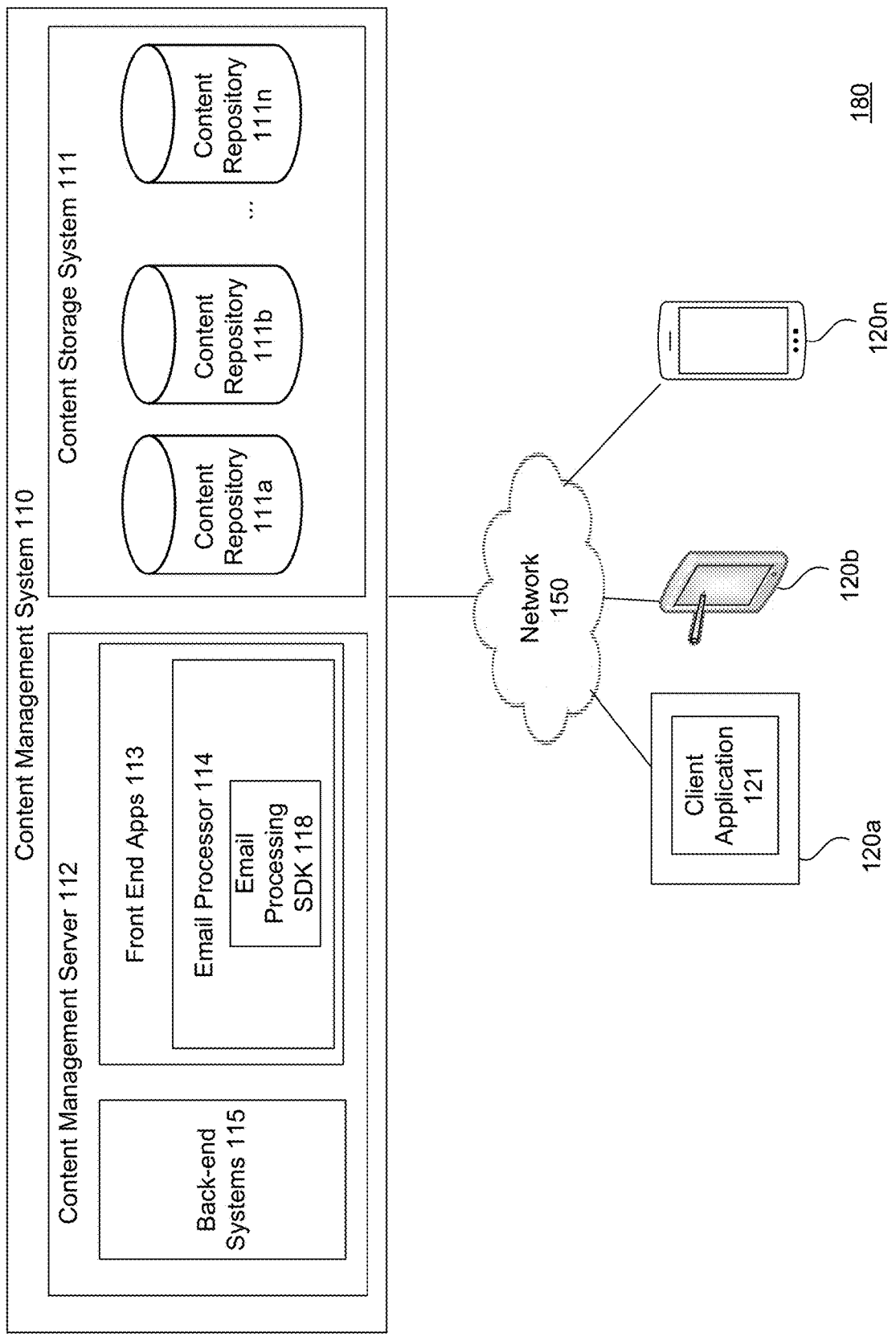
FIG. 1 illustrates an example high level block diagram of an enterprise content management architecture wherein the present invention may be implemented.

FIG. 1 illustrates an example high level block diagram of an enterprise content management architecture 100 wherein the present invention may be implemented. The enterprise may be a business, or an organization. As shown, the architecture 100 may include a content management system 110, and a plurality of user computing devices 120a, 120b, . . . 120n, coupled to each other via a network 150. The content management system 110 may include a content storage system 111 and a content management server 112. The content storage system 111 may have two or more content repositories, e.g., 111a, 111b . . . and 111n. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the content management system 110 via the network 150, and may be any commercially available computing devices including laptop computers, desktop computers, mobile phones, smart phones, tablet computers, netbooks, and personal digital assistants (PDAs). A client application 121 may run from a user computing device, e.g., 120*a*, and access content in the content management system 110 via the network 150. User computing devices 120*a*-120*n* are illustrated in more detail in FIG. 4.

The content storage system 111 may store content that client applications (e.g., 121) in user computing devices 120*a*-120*n* may access and may be any commercially available storage devices. As will be described with reference to FIG. 2 below, each content repository (e.g., 111*a*, 111*b* or 111*n*) may store a specific category of content, be the source repository for its content, and allow users to interact with its content in a specific business context.

The content management server 112 is typically a remote computer system accessible over a remote or local network, such as the network 150. The content management server 112 could be any commercially available computing devices. A client application (e.g., 121) process may be active on one or more user computing devices 120*a*-120*n*. The corresponding server process may be active on the content management server 112, as one of the front-end applications 113 described with reference to FIG. 2. The client application process and the corresponding server process may communicate with each other over the network 150, thus providing distributed functionality and allowing multiple client applications to take advantage of the information-gathering capabilities of the content management system 110.

In one implementation, the content management server 112 may include an email processor 114 which may control the process for processing emails, as will be described with reference to FIG. 8 below. In one embodiment, the email processor 114 is one of the front-end applications. In one embodiment, the email processor 114 may have a document creator for receiving incoming emails and creating documents, records and attachments to be stored in the content management system 110. In one embodiment, the email processor 114 may be implemented by a Java SDK, and may allow a customer to customize the email processor 114, as will be described with reference to FIGS. 6 and 7.

An email processing SDK 118 may be implemented by the Java SDK and may enable creation of additional email processors at the customer side based on the customer's business needs, e.g., taking the context from incoming emails, and use that to create records and documents. Each email processor may be associated with an email processor username, and may be configured to have a specific function. For example, one email processor may be configured to create documents for incoming emails and their attachments, while another email processor may be configured create records for incoming emails.

In one embodiment, the customer of the content management system 110 may have a number of different functional groups (e.g., R&D, and Safety). A functional group may have their own email processor which may be configured to process incoming emails based on the specific function of the group, e.g., creating a document, or a claim.

In one embodiment, the email processor 114 may enable extraction of email information, e.g., its sender, subject, the time it was sent, message ID, the whole body, and the attachment).

Although the front-end applications 113, the back-end systems 115 and the email processor 114 are shown in one server, it should be understood that they may be implemented in multiple computing devices.

In one implementation, the content management system 110 may be a multi-tenant system where various elements of hardware and software may be shared by one or more customers. For instance, a server may simultaneously process requests from a plurality of customers, and the content storage system 111 may store content for a plurality of customers. In a multi-tenant system, a user is typically associated with a particular customer. In one example, a user could be an employee of one of a number of pharmaceutical companies which are tenants, or customers, of the content management system 110.

In one embodiment, the content management system 110 may run on a cloud computing platform. Users can access content on the cloud independently by using a virtual machine image, or purchasing access to a service maintained by a cloud database provider.

In one embodiment, the content management system 110 may be provided as Software as a Service ("SaaS") to allow users to access the content management system 110 with a thin client.

Figure 2:
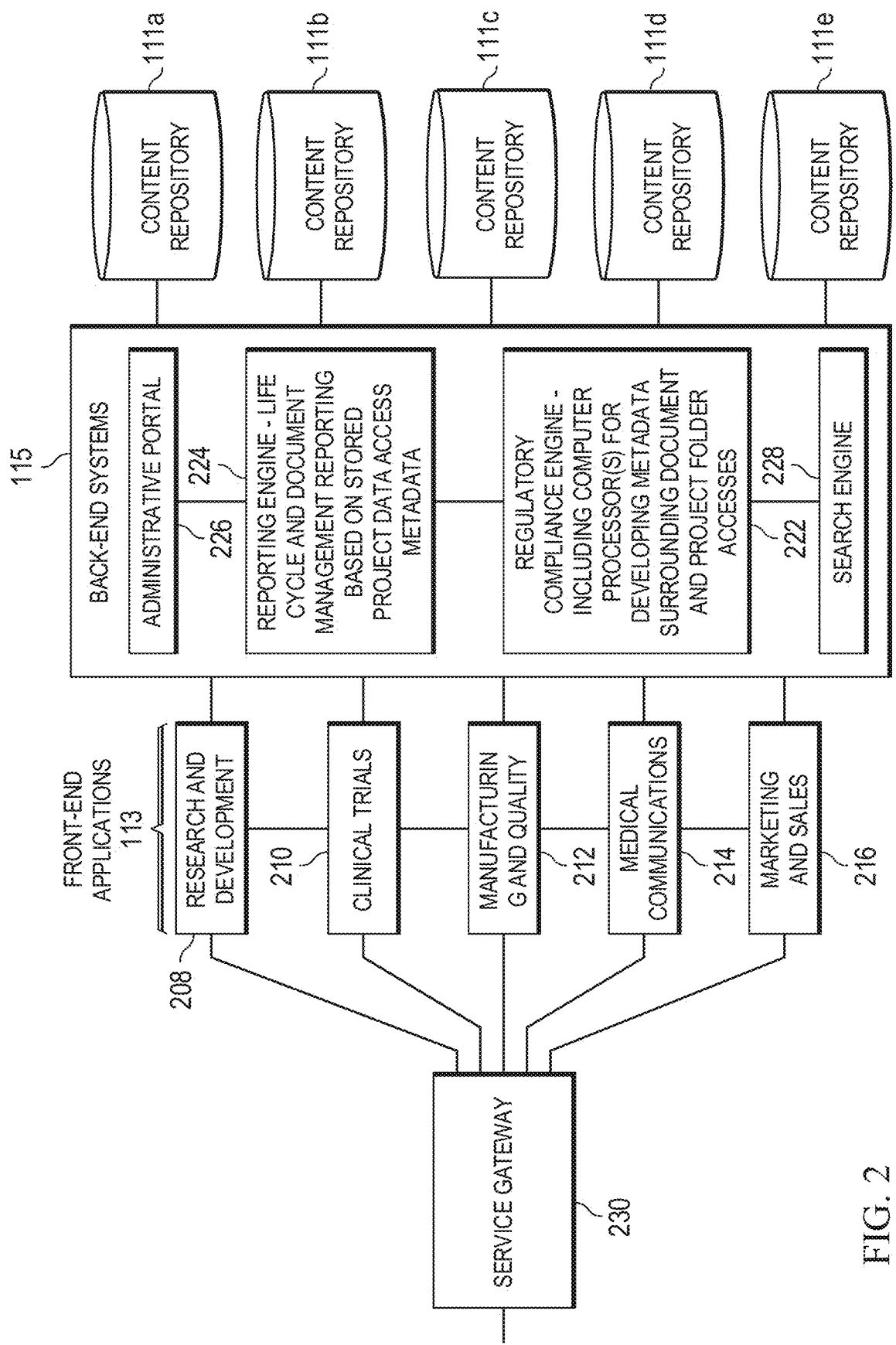
FIG. 2 provides a description of the content management system with additional specific applications and interfaces connected thereto.

FIG. 2 provides a description of the content storage system 111 with additional specific applications and interfaces connected thereto. In an embodiment, this content storage system 111 is a cloud-based or distributed network based system for consolidating an enterprise's data, oftentimes integrating multiple content repositories in an enterprise into a single system having coordinated control, measuring, and auditing of data creation, access and distribution.

In an embodiment of the content storage system 111 for the life sciences industry, as illustrated in the figure, this content storage system 111 can include specific data collections for the following areas and/or business process-specific front-end applications 113:

The Research & Development (R&D) front-end application 208 provides for an aggregation of materials in support of research and initial clinical trial submissions through building organized and controlled content repositories within the content management system 110, more specifically, the content repository 111*a*. Elements that can be stored, organized, and managed through this front-end include submission bills of materials, Drug Information Association (DIA) reference models support, and submission-ready renderings. This front-end 208 is designed to provide an interface to the content management system 110 whereby researchers, contract research organizations (CROs), and other collaboration partners can access and/or distribute content through a single controlled document system.

The clinical trials front-end application 210 provides for faster and more organized access to trial documents and reports, while supporting seamless collaboration between sponsors, CROs, sites, investigators and other trial participants. Specific features both ease study and site administration as well as support the DIA trial master file (TMF) reference model. Having this front-end application providing access to the content management system 110 further provides for efficient passing off of content, e.g., in the content repository 111*b*, between this phase and other phases of the life sciences development process.

The manufacturing and quality application 212 enables the creation, review, approval and distribution of controlled documents across the organization and with external partners in the context of materials control and other manufacturing elements. The application 212 provides functionality in support of the manufacturing process including watermarking, controlled print, signature manifestation and "Read and Understood" signature capabilities. The documents and metadata associated with this process is managed and stored in the content management system 110, or more specifically, the content repository 111c, whereby it can be assured that the related documents are not distributed in contravention of law and company policy.

The medical communications application 214 provides for communications with medical facilities, including call center access, integration, and interface functionality. Particular access control features and metadata associated with this application 214 include expiration and periodic review elements, multi-channel support, global documents and automatic response package generation through the content management system 110. Related documents may be stored in the content repository 111d.

The marketing and sales application 216 provides an end-to-end solution for the development, approval, distribution, expiration and withdrawal of promotional materials. Specific features include support for global pieces, approved Form FDA 2253 (or similar international forms) form generation, online document, and video annotation, and a built-in digital asset library (DAL). Again, the communications may be through the content management system 110, and the promotional materials may be stored in the content repository 111e.

In disclosed embodiments, there are provided a number of back-end system applications 115 that provide for the management of the data, forms, and other communications in the content management system 110. For example, the back-end systems applications 115 may include a regulatory compliance engine 222 to facilitate regulatory compliance, including audit trail systems, electronic signatures systems, and system traceability to comply with government regulations, such as 21 CFR Part 11, Annex 11 and G×P-related requirements. The regulatory compliance engine 222 may include processors for developing metadata surrounding document and project folder accesses so from a regulatory compliance standpoint it can be assured that only allowed accesses have been permitted. The regulatory compliance engine 222 may further includes prevalidation functionality to build controlled content in support of installation qualification (IQ) and/or operational qualification (OQ), resulting in significant savings to customers for their system validation costs.

In further disclosed embodiments, the back-end systems 115 may contain a reporting engine 224 that reports on documents, their properties and the complete audit trail of changes. These simple-to-navigate reports show end users and management how content moves through its life cycle over time, enabling the ability to track 'plan versus actual' and identify process bottlenecks. The reporting engine may include processors for developing and reporting life cycle and document management reporting based on stored project data and access metadata relative to documents, forms and other communications stored in the content management system 110.

In further disclosed embodiments, the back-end systems 115 can include an administrative portal 226 whereby administrators can control documents, properties, users, security, workflow and reporting with a simple, point-and-click web interface. Customers also have the ability to quickly change and extend the applications or create brand new applications, including without writing additional software code.

In further disclosed embodiments, the back-end systems 115 may include a search engine 228 whereby the content management system 110 can deliver simple, relevant and secure searching.

The content management system 110 may have more back-end systems.

In providing this holistic combination of front-end applications 113 and back-end systems 115, the various applications can further be coordinated and communicated with by the service gateway 230, which in turn can provide for communications with various web servers and/or web services APIs. Such web servers and/or web services APIs can include access to the content and metadata layers of some or all of the various front-end applications 113 and back end systems 115, enabling seamless integration among complementary systems.

In the context of the described embodiments, content in one repository, e.g., the content repository 111a for the Research & Development (R&D) front-end application 208, may be re-used in another repository (e.g., the content repository 111d) with another front-end application (e.g., the medical communications application 214).

The content management system 110 may store content for other industries.

Figure 3:
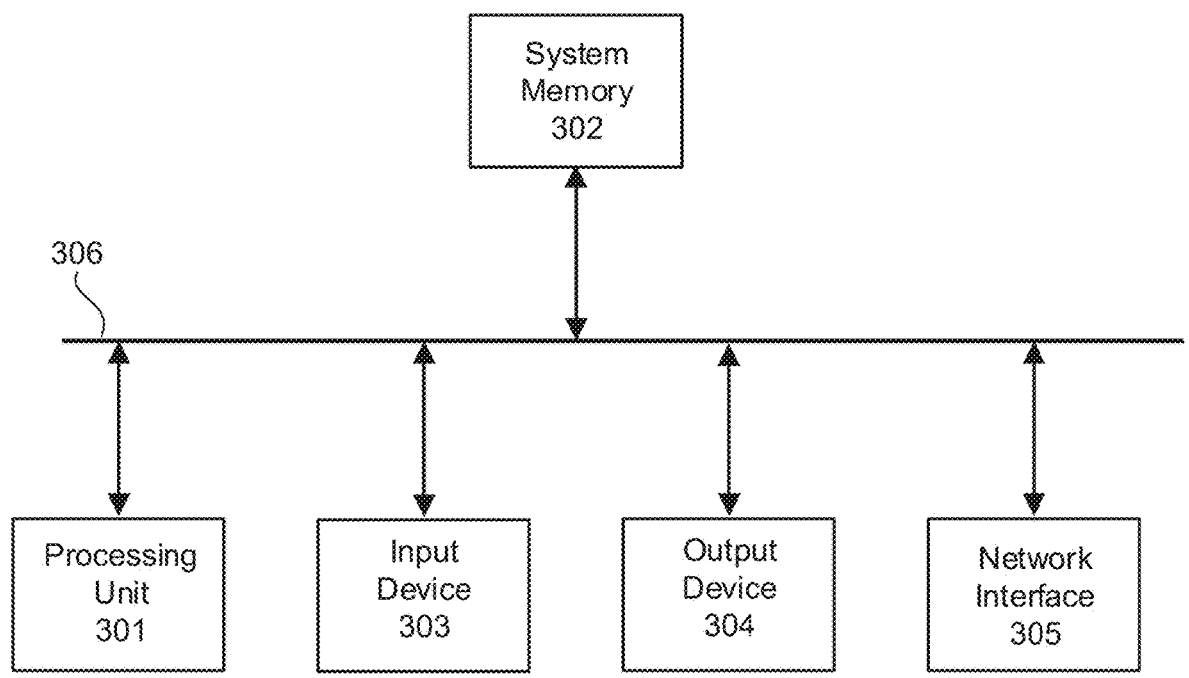
FIG. 3 illustrates an example block diagram of a computing device.

FIG. 3 illustrates an example block diagram of a computing device 300 which can be used as the user computing devices 120a-120n, and the content management server 112 in FIG. 1. The computing device 300 is only one example of a suitable computing environment and is not intended to suggest any limitation as to scope of use or functionality. The computing device 300 may include a processing unit 301, a system memory 302, an input device 303, an output device 304, a network interface 305 and a system bus 306 that couples these components to each other.

The processing unit 301 may be configured to execute computer instructions that are stored in a computer-readable medium, for example, the system memory 302. The processing unit 301 may be a central processing unit (CPU).

The system memory 302 typically includes a variety of computer readable media which may be any available media accessible by the processing unit 301. For instance, the system memory 302 may include computer storage media in the form of volatile and/or nonvolatile memory such as read only memory (ROM) and/or random access memory (RAM). By way of example, but not limitation, the system memory 302 may store instructions and data, e.g., an operating system, program modules, various application programs, and program data.

A user can enter commands and information to the computing device 300 through the input device 303. The input device 303 may be, e.g., a keyboard, a touchscreen input device, a touch pad, a mouse, a microphone, and/or a pen.

The computing device 300 may provide its output via the output device 304 which may be, e.g., a monitor or other type of display device, a speaker, or a printer.

The computing device 300, through the network interface 305, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 305 may be configured to allow the computing device 300 to transmit and receive data in a network, for example, the network 150. The network interface 305 may include one or more network interface cards (NICs).

Figure 4:
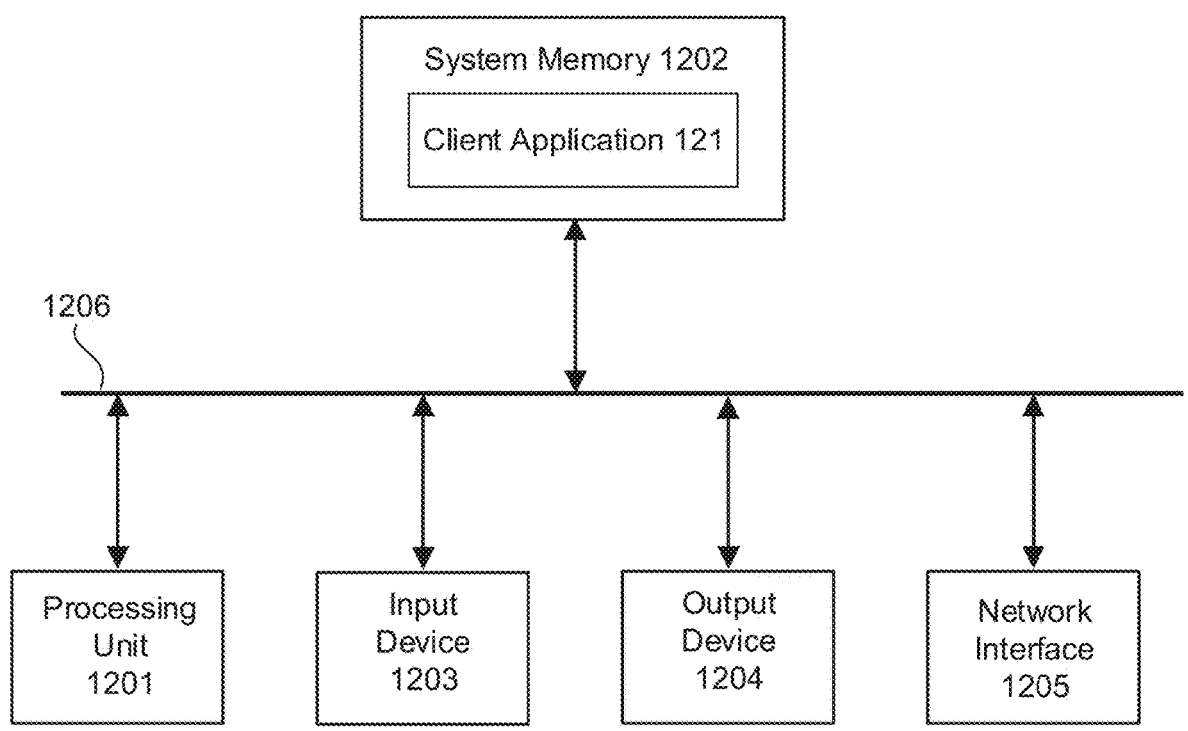
FIG. 4 illustrates an example high level block diagram of a user computing device.

FIG. 4 illustrates an example high level block diagram of a user computing device (e.g., 120a) wherein the present invention may be implemented. The user computing device 120a may be implemented by the computing device 300 described above, and may have a processing unit 1201, a system memory 1202, an input device 1203, an output device 1204, and a network interface 1205, coupled to each other via a system bus 1206. The system memory 1202 may store the client application 121.

Figure 5:
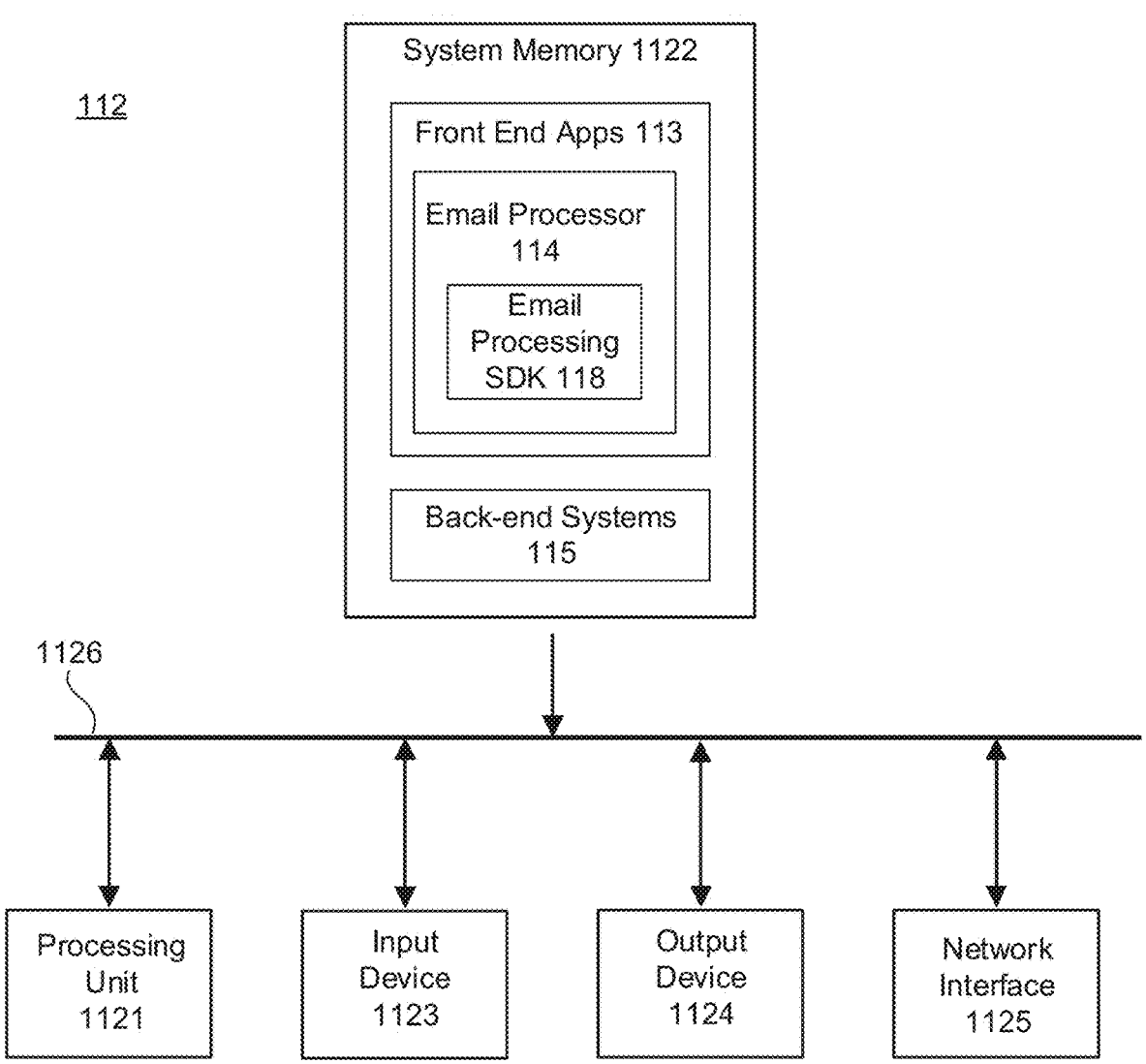
FIG. 5 illustrates an example high level block diagram of the content management server according to one embodiment of the present invention.

FIG. 5 illustrates an example high level block diagram of the content management server 112 according to one embodiment of the present invention. The content management server 112 may be implemented by the computing device 300, and may have a processing unit 1121, a system memory 1122, an input device 1123, an output device 1124, and a network interface 1125, coupled to each other via a system bus 1126. The system memory 1122 may store the front-end applications 113, the back-end systems 115, and the email processor 114.

Figure 6:
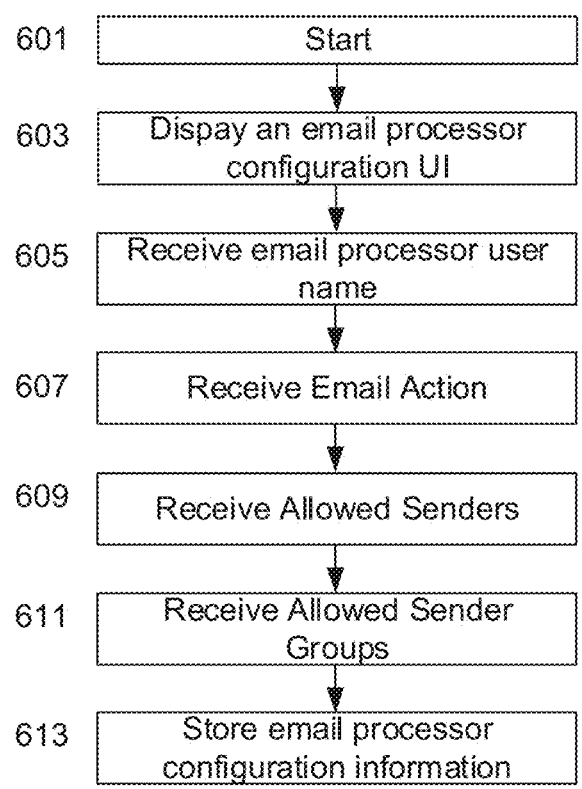
FIG. 6 illustrates a flowchart of a method for configuring an email processor in an enterprise content management system according to one embodiment of the present invention.

FIG. 6 illustrates a flowchart of a method for configuring an email processor in an enterprise content management system according to one embodiment of the present invention. The process may be controlled by the email processor 114, and start at 601.

The administrator may choose to use a standard email processor, or customize configurations associated with an email processor.

At 603, an email processor configuration user interface may be displayed when an administrator of a customer of the content management system 110 logs in the content management system 110 and selects the email processing service.

Figure 7:
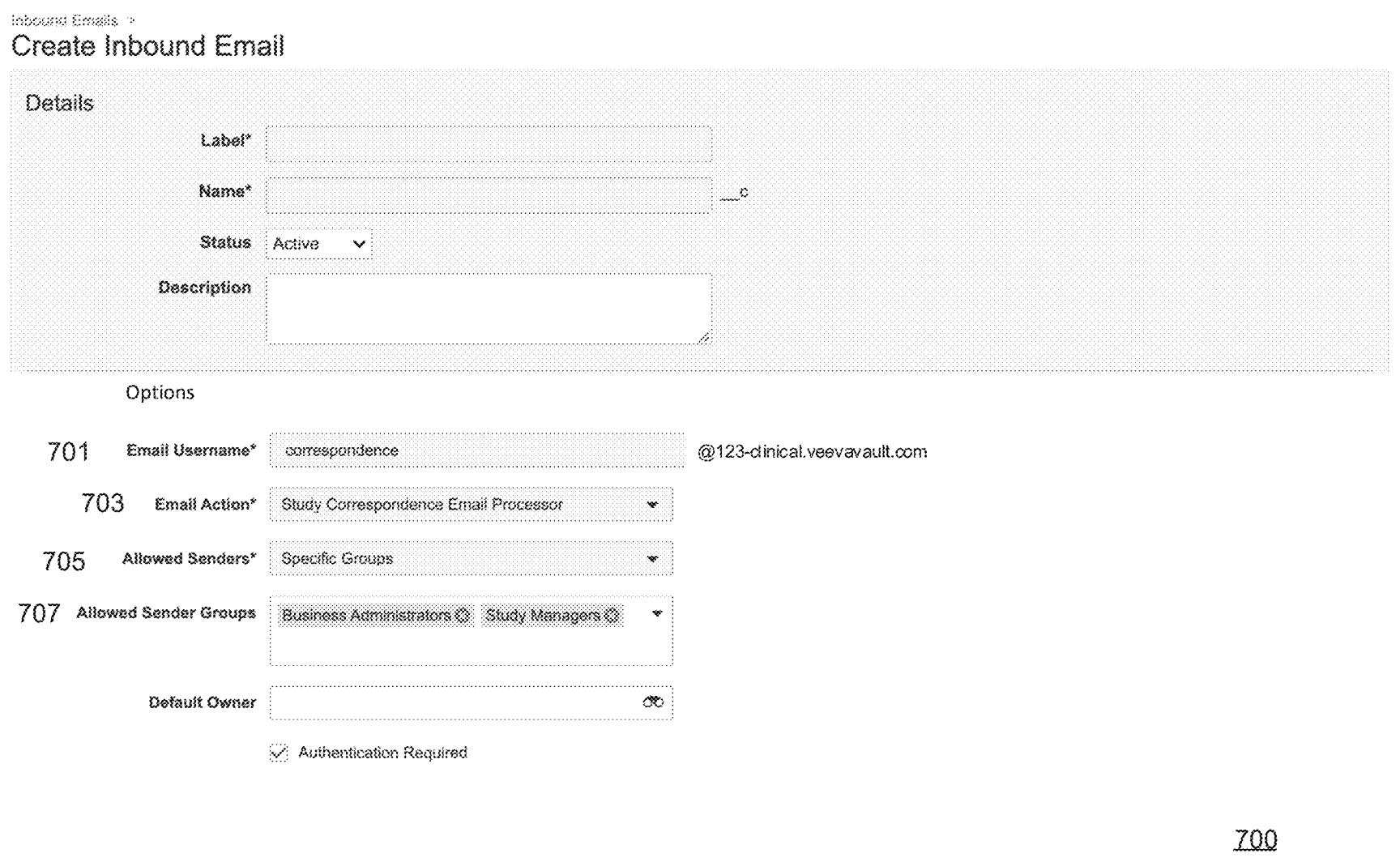

FIG. 7 illustrates an embodiment of an email processor configuration user interface according to one embodiment of the present invention. As shown, the email processor configuration user interface 700 may have a number of windows for receiving configuration information of the email processor 114, including a window 701 for receiving Email Processor Username, a window 703 for receiving Email Action, a window 705 for defining Allowed Senders, a window 707 for receiving selection of Allowed Sender Groups, and a window 709 for receiving information of the Default Owner.

At 605, an email processor username may be received at the window 701. The email processor username may be created by the administrator based on business needs, and could be, e.g., correspondance@123-clinical.veevavault.com. The email processor username may be associated with an email processor.

At 607, an Email Action may be received at the window 703 to associate the email processor username received at 605 with an email processor, e.g., Study Correspondence Email Processor. In one embodiment, a drop-down menu may be provided, so that the administrator can see some options.

At 609, Allowed Senders may be received at the window 705. Allowed Senders may be used to control security of the email processing by only allowing those in the Allowed Senders to send emails to the email processor. If an incoming email is not from a user in the Allowed Senders, the email processor 114 will not process it, and a notice may be sent to the sender. The Allowed Senders may include all end users associated with the customer of the content management system 110, or users in a certain group. In one embodiment, anyone with the customer's security approval may be added to the Allowed Senders. For example, a pharmaceutical company may allow its patients to send emails to its email processor.

At 611, Allowed Sender Groups may be received at the window 707. Each sender may belong to a specific group defined by the customer, e.g., by job responsibilities.

At 613, the email processor configuration information may be saved.

Figure 8:
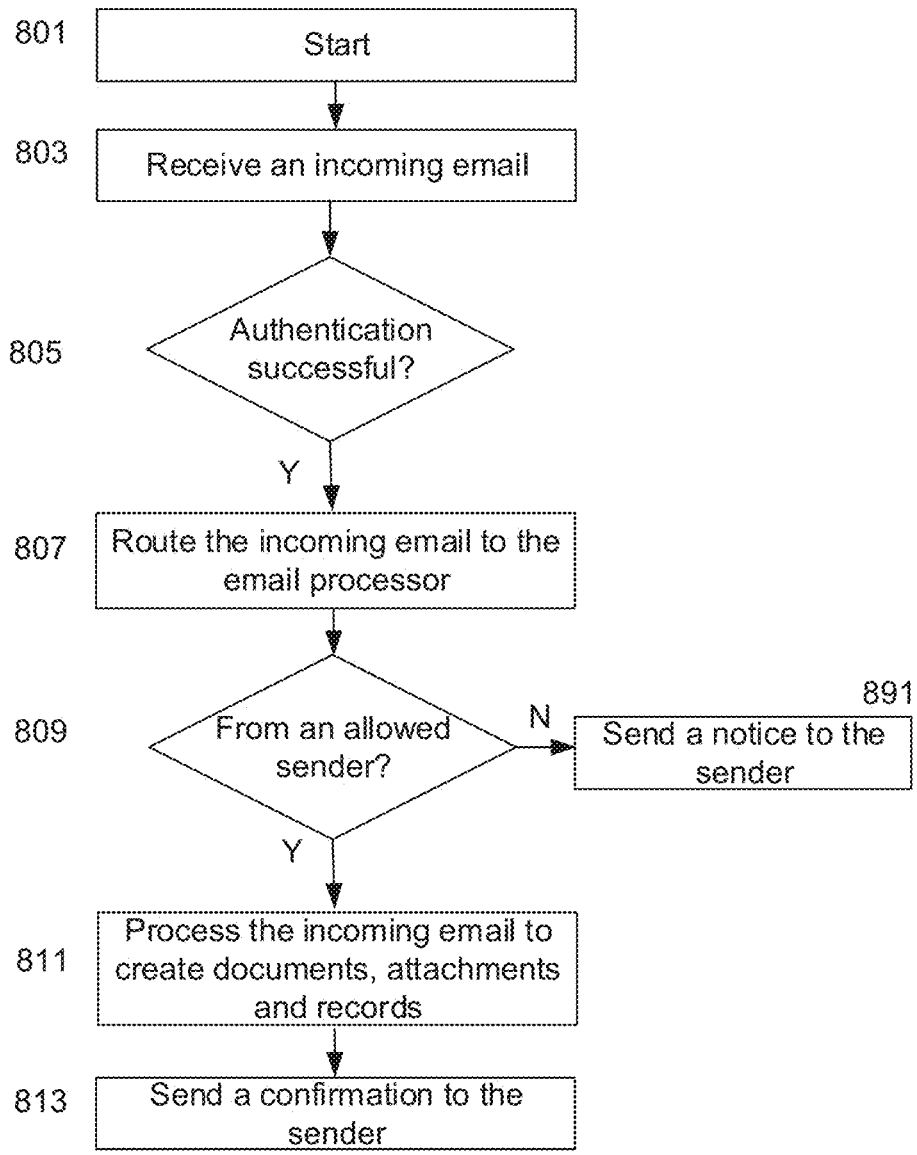
FIG. 8 illustrates a flowchart of a method for processing emails in an enterprise content management system according to one embodiment of the present invention.

FIG. 8 illustrates a flowchart of a method for processing emails in an enterprise content management system according to one embodiment of the present invention. The process may be controlled by the email processor 114, and start at 801.

At 803, an incoming email may be received.

At 805, the incoming email may be authenticated. In one embodiment, the email may be authenticated with the Sender Policy Framework ("SPF") protocol or the DomainKeys Identified Mail ("DKIM") protocol to make sure it is actually coming from who says it is from. In one embodiment, the incoming email may be authenticated at an email server which communicates with the content management system 110 via the network 150. In one embodiment, the email server may also check viruses and spams. In one embodiment, the email server may be operated by a third party.

If the authentication is successful, at 807, the incoming email may be routed to the email processor associated with the email username, e.g., correspondence@123.veevavault.com.

At 809, it may be determined if the incoming email is from a user in the Allowed Senders or Allowed Sender Groups. If not, a notice may be sent to the sender at 891.

If the incoming email is from a user in the Allowed Senders or Allowed Sender Groups, at 811, the incoming email may be processed by the email processor 114 based on its configuration, e.g., creating the email file as a document, or an email object record. The object record may have all important fields of the email, e.g., its sender, subject, message ID, and the time it was sent. If there are attachments to the email, a separate document may be created for each attachment. The documents and records are stored in the content storage system 111. In addition, an email-document record linking the email record to the documents may be created, and a notification with links to the documents may be sent to users.

At 813, a confirmation may be sent to the sender of the incoming email. In one embodiment, the notification with links may be included in the confirmation.

In one embodiment, the email processor 114 may send the documents created from the incoming email to other applications in the content management system 110 based on configurations of a customer administrator. In one example, the documents created from the incoming email and its attachments may be sent to a clinical trial study application and associated with a clinical trial study. In one example, the documents created from the incoming email and its attachments may be sent to a safety application and used to create a claim record.

In one embodiment, the Email processing SDK 118 may enable creation of additional email processors at the customer side based on the customer's business needs, e.g., taking the context from incoming emails, and use that to create records and documents. Each email processor may be associated with an email processor username, and may be configured to have a specific function. For example, one email processor may be configured to create documents for incoming emails and their attachments, while another email processor may be configured create records for incoming emails.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A computer-implemented method for processing emails in a content management system, wherein the content management system comprises a first repository, a second repository, and a first email processor, the method comprising:

displaying an email processor configuration user interface, wherein the email processor configuration user interface has a plurality of areas for receiving configuration information for the first email processor, wherein the configuration information configures the first email processor to process a first incoming email based on a first output data format requirement of a first application running in the content management system, wherein the first output data format requirement of the first application running in the content management system is different from a second output data format requirement of a second application running in the content management system, wherein the first output data format requirement of the first application defines the first data format to be created from the first incoming email, and wherein the second output data format requirement of the second application defines the second data format to be created from the first incoming email;

receiving, at a first area on the email processor configuration user interface, a first email processor username, wherein the first email processor username is associated with the first email processor;

receiving, at a second area on the email processor configuration user interface, a first group of allowed senders who are allowed to send emails to the first email processor username;

receiving, at a third area on the email processor configuration user interface, a selection of the first email processor to associate the first email processor username with the first email processor;

receiving the first incoming email at the first email processor; and determining if a sender of the first incoming email is in the first group of allowed senders by the email processor.

2. The computer-implemented method of claim 1, further comprising: when the sender of the first incoming email is in the first group of allowed senders, generating a first document and storing the first document in the first repository by the first email processor, wherein the first document is a copy of the first incoming email.

3. The computer-implemented method of claim 1, further comprising: generating a second document and storing the second document in the first repository by the first email processor, wherein the second document is a copy of an attachment of the first incoming email.

4. The computer-implemented method of claim 1, further comprising:

generating a first object record for the first incoming email, wherein the first object record comprises the sender of the email, and a subject of the first incoming email.

5. The computer-implemented method of claim 4, wherein the first object record further comprises a time the first incoming email was sent.

6. The computer-implemented method of claim 2, further comprising:

generating a first object record for the first incoming email, wherein the first object record comprises the sender of the email, and a subject of the first incoming email; and generating a first email-document record linking the first object record to the first document.

7. The computer-implemented method of claim 1, further comprising: sending a confirmation message to the sender of the first incoming email.

8. The computer-implemented method of claim 6, further comprising: sending a confirmation message to the sender of the first incoming email, wherein the confirmation message comprises the first email-document record linking the first object record to the first document.

9. The computer-implemented method of claim 1, further comprising: storing information received on the email processor configuration user interface.

10. The computer-implemented method of claim 2, further comprising: sharing the first document with the second repository.

11. The computer-implemented method of claim 9, further comprising:

receiving, at the first area on the email processor configuration user interface, a second email processor username, wherein the second email processor username is associated with a second email processor;

receiving, at the second area on the email processor configuration user interface, a second group of allowed senders who are allowed to send emails to the second email processor username;

receiving, at the third area on the email processor configuration user interface, a selection of the second email processor to associate the second email processor username with the second email processor;

receiving a second incoming email at the second email processor; and determining if a sender of the second incoming email is in the second group of allowed senders by the second email processor.

12. The computer-implemented method of claim 1, wherein first output data format requirement of the first application running in the content management system is to create a document from the first incoming email.

13. The computer-implemented method of claim 1, wherein the second output data format requirement of the second application running in the content management system is to create a data record from the first incoming email.

* * * * *